US008918565B2

(12) United States Patent
Kennedy

(10) Patent No.: US 8,918,565 B2
(45) Date of Patent: Dec. 23, 2014

(54) TABLET COMPUTER SCREEN AND MOBILE PHONE SCREEN TO DIGITAL I/O CONVERTER

(75) Inventor: Robert Dennis Kennedy, Honolulu, HI (US)

(73) Assignee: Robert Dennis Kennedy, Honolulu, HI (US)

( * ) Notice: Subject to any disclaimer, the term of this patent is extended or adjusted under 35 U.S.C. 154(b) by 355 days.

(21) Appl. No.: 13/475,942

(22) Filed: May 19, 2012

(65) Prior Publication Data

US 2013/0311689 A1  Nov. 21, 2013

(51) Int. Cl.
*G06F 13/00* (2006.01)
*G06F 1/16* (2006.01)

(52) U.S. Cl.
CPC ............ *G06F 1/1632* (2013.01); *G06F 1/1626* (2013.01)
USPC ............... 710/69; 710/70; 345/173; 345/174; 345/175; 715/702

(58) Field of Classification Search
None
See application file for complete search history.

(56) References Cited

U.S. PATENT DOCUMENTS

| | | | | |
|---|---|---|---|---|
| 7,027,781 B2* | 4/2006 | Ko | ................................... | 455/92 |
| 7,184,009 B2* | 2/2007 | Bergquist | ........................ | 345/90 |
| 7,236,161 B2* | 6/2007 | Geaghan et al. | ............. | 345/173 |
| 7,362,313 B2* | 4/2008 | Geaghan et al. | ............. | 345/173 |
| 7,706,611 B2* | 4/2010 | King et al. | .................... | 382/181 |
| 8,064,700 B2* | 11/2011 | King et al. | .................... | 382/181 |
| 8,576,182 B2* | 11/2013 | Hristov | ......................... | 345/173 |
| 8,620,083 B2* | 12/2013 | King et al. | .................... | 382/181 |
| 8,725,443 B2* | 5/2014 | Uzelac et al. | ................... | 702/79 |
| 2002/0149607 A1* | 10/2002 | Ito | ................................. | 345/690 |
| 2002/0191782 A1* | 12/2002 | Beger et al. | ................... | 379/454 |
| 2003/0013500 A1* | 1/2003 | Dunoff et al. | ................ | 455/569 |
| 2003/0234759 A1* | 12/2003 | Bergquist | ........................ | 345/92 |
| 2004/0140993 A1* | 7/2004 | Geaghan et al. | ............. | 345/702 |
| 2004/0183787 A1* | 9/2004 | Geaghan et al. | ............. | 345/173 |
| 2005/0062725 A1* | 3/2005 | Shih | ............................. | 345/173 |
| 2005/0270272 A1* | 12/2005 | Shi | ................................ | 345/173 |
| 2006/0078207 A1* | 4/2006 | King et al. | .................... | 382/229 |
| 2006/0172765 A1* | 8/2006 | Lev | ............................ | 455/550.1 |
| 2007/0060224 A1* | 3/2007 | Liu | ............................ | 455/575.8 |
| 2008/0211782 A1* | 9/2008 | Geaghan et al. | ............. | 345/173 |
| 2009/0231299 A1* | 9/2009 | Shi | ................................ | 345/173 |
| 2011/0050620 A1* | 3/2011 | Hristov | ......................... | 345/174 |

(Continued)

FOREIGN PATENT DOCUMENTS

CN         102609343 A    *  7/2012

OTHER PUBLICATIONS

'Embedded Controller [definition and description]' by United Electronic Industries, copyright 2006.*

*Primary Examiner* — Steven Snyder

(57) ABSTRACT

An adapter that fits to a touchscreen of a tablet computer or mobile phone enabling input and output to and from the device. Output is achieved by a plurality of phototransistors arranged in a matrix which interpret a plurality of video image dots, squares or groups of pixels on the tablet computer or mobile phone touchscreen converting them to 1s (ones) or 0s (zeroes).
Input is achieved by a plurality of conductors which are selectively electrified by control electronics to a charge sufficient to disrupt the field or capacitance of the touchscreen finger tip sense at a plurality of locations on the screen. A program(s) on the tablet computer or mobile phone interprets the electronically controlled touches as data.

4 Claims, 12 Drawing Sheets

(56) References Cited

U.S. PATENT DOCUMENTS

| | | | |
|---|---|---|---|
| 2011/0267782 A1* | 11/2011 | Petrick et al. | 361/724 |
| 2011/0297564 A1* | 12/2011 | Kim et al. | 206/320 |
| 2012/0187956 A1* | 7/2012 | Uzelac et al. | 324/537 |
| 2012/0188176 A1* | 7/2012 | Uzelac et al. | 345/173 |
| 2012/0188197 A1* | 7/2012 | Uzelac et al. | 345/174 |
| 2012/0191394 A1* | 7/2012 | Uzelac et al. | 702/79 |
| 2013/0278539 A1* | 10/2013 | Valentine et al. | 345/174 |
| 2014/0069791 A1* | 3/2014 | Chu et al. | 200/5 A |

* cited by examiner

TABLET COMPUTER SCREEN AND MOBILE PHONE SCREEN TO DIGITAL I/O CONVERTER

FIELD OF THE INVENTION

This invention relates to an input and output adapter for tablet computer touchscreens and mobile phone touchscreens and more particularly to allow tablet computers and mobile phones to be used as continuous monitoring and control devices.

BACKGROUND OF THE INVENTION

In general commercially available off the shelf computers, tablets and mobile phones have increasingly less input and output (I/O) capability aside from wireless. Increasingly parallel printer ports, serial ports, mini-card slots (such as SD, SD-micro), and bus or I/O card slots have been eliminated with the exception of USB (Universal Serial Bus) and HDMI (High-Definition Multimedia Interface). The USB available on many hand held computers and smart phones does not provide host capability.

Despite the fact that mobile phones and tablet computers have become multiprocessor platforms well suited to be real-time monitoring and control devices individually or in a larger system with real-time constraints these devices have been increasingly limited by limited input and output.

In particular it is more difficult to use a tablet computer or mobile phone in a monitoring and control system as was done prior with computers such as the desktop personal computer which had bus slots (such as the ISA, VESA, PCI to name a few) or parallel ports which could be used for input and output found on the earliest desktop units. VME was also widely used as a bus wherein I/O could be customized in various combinations of discrete inputs and outputs and analog inputs and outputs via cards. Other customized cards for motion control (motor control), robotics and many other applications existed.

In view of these disadvantages, it is the object of this invention to make new increasingly restricted tablet computers and mobile phones more general purpose by this converter as an angled surface, enclosure, slot, rack, sleeve, clear material which uses the tablet computer or mobile phone's existing human interface (touchscreen) and software (EG MP4 player application, PNG image viewer application) and customized software to provide input and output (I/O) to the tablet computer or mobile phone used in the same manner as older PCI bus cards or VME bus cards to provide digital and analog I/O.

SUMMARY OF THE INVENTION

A digital input and output converter for tablet computers and mobile phones that overcomes disadvantages of prior art by using the common touchscreen found on most tablet computers and mobile phones to provide input and output allowing tablet computers and mobile phones to be used for monitoring and control. For the input converter: a grid overlays the touchscreen and has a plurality of conductors electrically charged such that an electric field disturbs the touchscreen to trigger the mobile phone or tablet computer touchscreen.

A plurality of locations on the screen are used to receive input data. Software on the mobile phone or tablet computer relies on one of the signals (touch location) as a clock. This allows a stream of ones and zeros to be be interpreted serially or in parallel in a bus cycle. A lack of touch sense during data transfer indicates a 1 with the reverse, a touch sensed, indicating a 0. The inverse logic is also available wherein a lack of touch sense during data transfer indicates a 0 and a touch sensed indicating a 1.

The output converter is achieved by a plurality of phototransistors arranged in a matrix which interpret a plurality of video image dots, squares or groups of pixels on the tablet computer or mobile phone screen converting them to is (ones) or Os (zeroes).

BRIEF DESCRIPTION OF THE DRAWINGS

The foregoing and other objects and advantages of the invention will become more clear with reference of the following detailed description as illustrated by the drawings in which.

DETAILED DESCRIPTION

FIGS. 1 through 8 detail a monitoring and control system according to this invention. Nevertheless, this description should be considered to apply to any type of data that requires I/O signals to and/or from a tablet computer or mobile phone. Thus, while this embodiment details input and output converters for monitoring and control using a single tablet computer or mobile phone and this embodiment details a monitoring and control system with a plurality of mobile phones/tablet computers, the system herein can be adapted to a variety of other data, data I/O, and data monitoring such as telemetry, pharmaceutical delivery, entertainment, games, pattern recognition, encryption, industrial controls, wireless probe devices, security devices, process controls, manufacturing facilities, robots, automated guided vehicles, unmanned aerial vehicles, food and beverage automation, boiler control, furnace control, avionics, aircraft/watercraft/ spacecraft navigation, aircraft flight control, watercraft/ spacecraft control, watercraft/spacecraft displays, aircraft flight displays, vehicle control, sound transmission, automotive displays, engine control, climate control, home automation, medical, wireless hand held data acquisition, optical controls, photography, electric generator coil manipulation, electric motor control, musical instrument, musical amplification, musical instrument sound manipulation, radar control and signal processing and display, cash register, weather instrumentation, sewage processing, water treatment, data acquisition, construction equipment, hydraulic controls, automatic teller machines.

Figure 1:
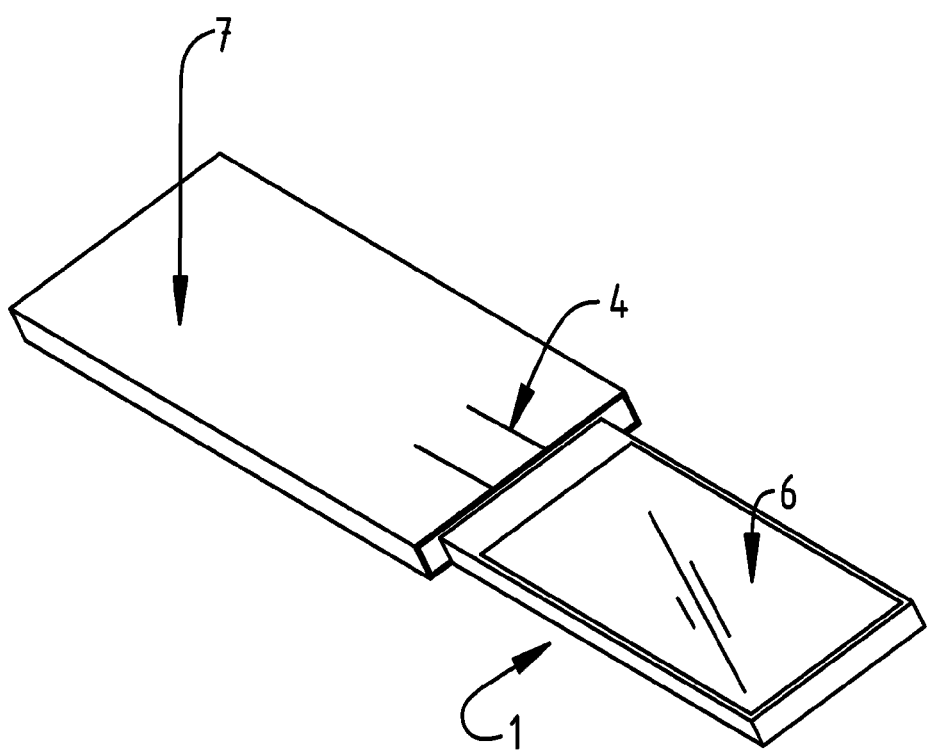
FIG. 1 is a perspective view of a tablet computer and mobile phone input and output converter enclosure type system according to this invention
Figure 2:
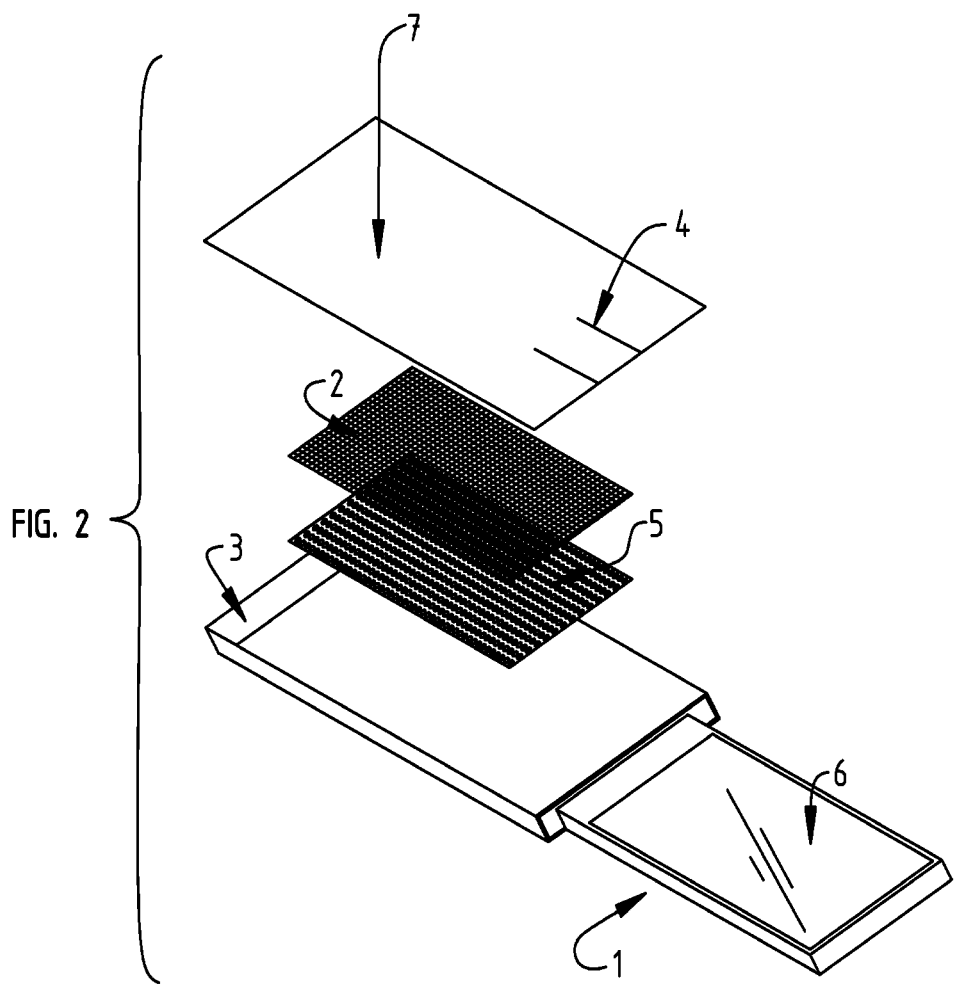
FIG. 2 is an exploded view of the input and output converter enclosure type system of FIG. 1

FIG. 1 and FIG. 2 detail a single slot hinged or unhinged enclosure system 7 wherein the mobile phone or tablet computer 1 slides into position and secures with a latch 4 so that the touchscreen 6 is aligned with an input converter 2 and output converter 5 and any other interface electronic connection and back-plane 3.

Figure 3:
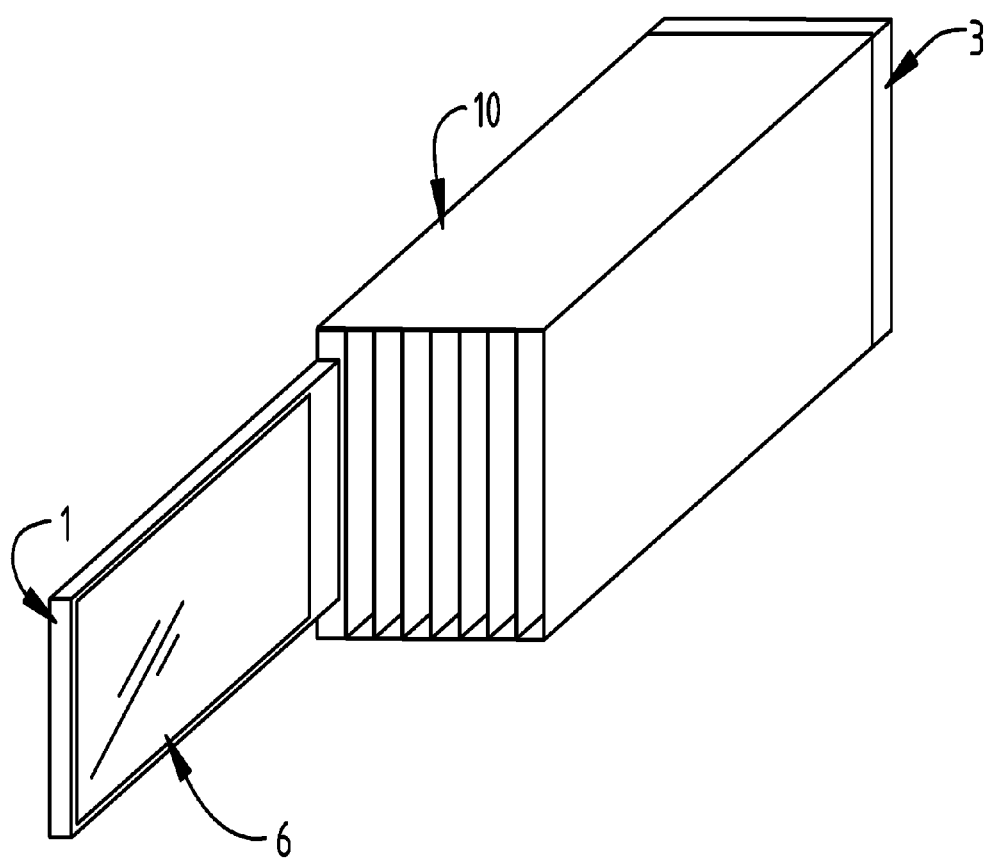
FIG. 3 is a perspective view of a rack system and including a plurality of tablet computer and or mobile phone converters including the combined input and output converters according to this invention
Figure 4:
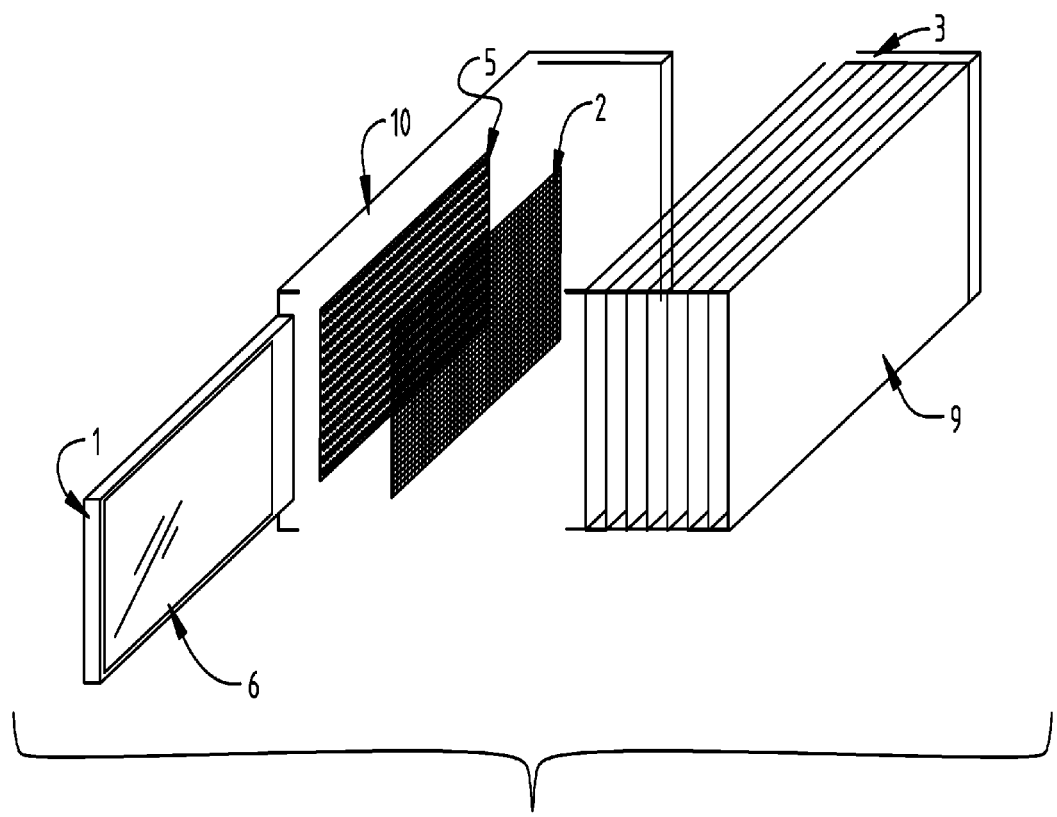
FIG. 4 is an exploded view of the input and output converter combination showing one of a plurality of slots of FIG. 3

FIG. 3 and FIG. 4 detail a rack 9 system consisting of a plurality of mobile phones or tablet computers 1 wherein each slot 10 contains an input converter 2 and an output converter 5 aligning with the touchscreen 6, and any other interface electronic connection and back-plane 3.

Figure 5:
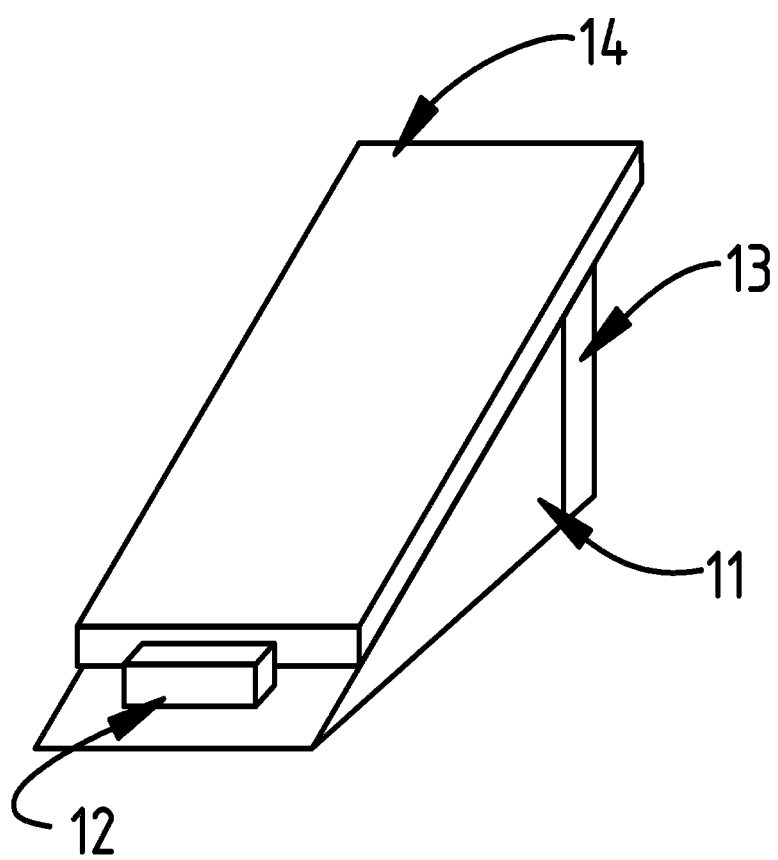
FIG. 5 is a perspective view of an angled tablet computer and mobile phone input and output converter system according to this invention
Figure 6:
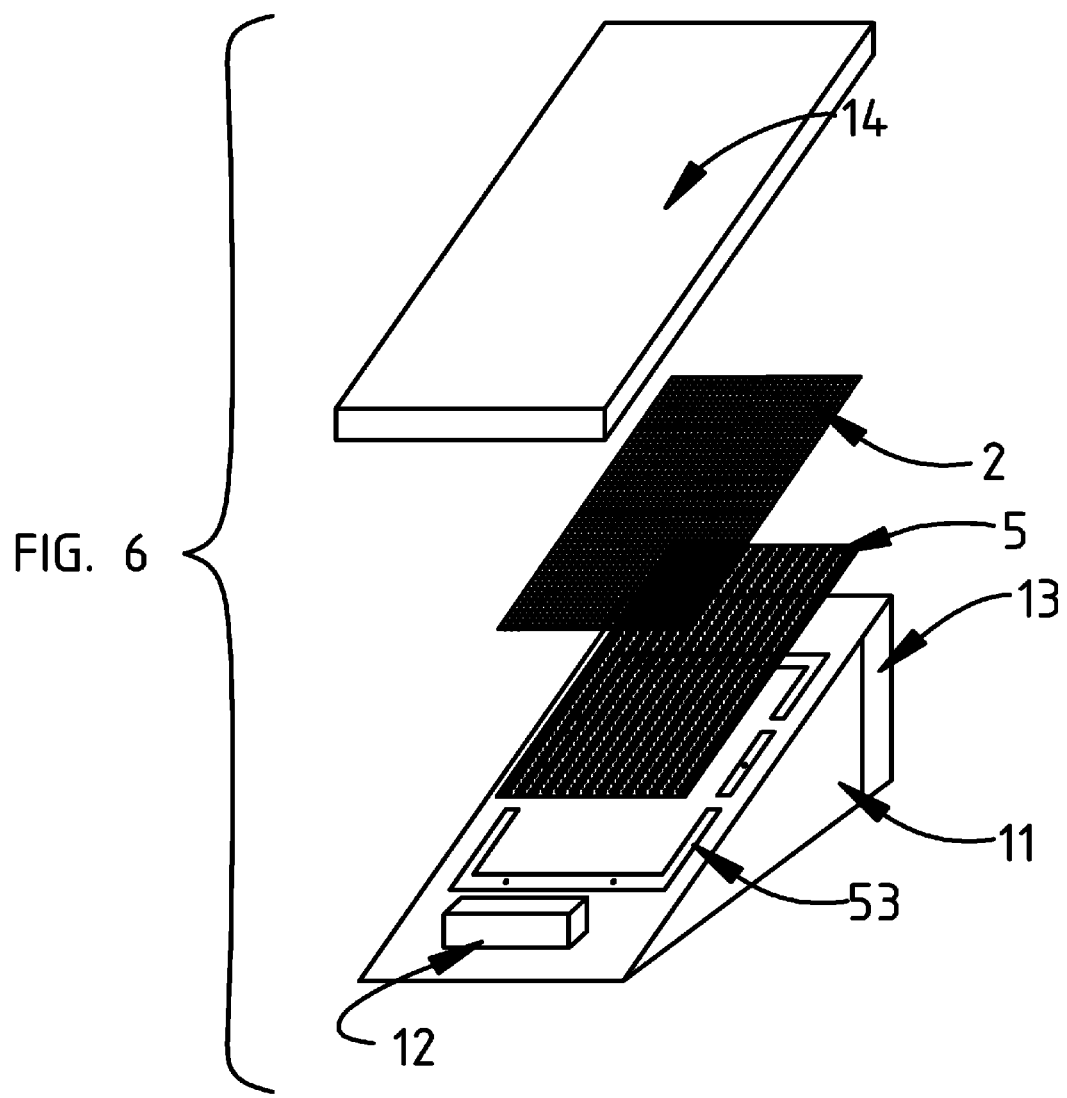
FIG. 6 is an exploded view of the input output converter combination of FIG. 5

FIGS. 5 and 6 detail an angled converter 11 system wherein a tablet computer or mobile phone 14 touchscreen faces toward an input converter 2 and an output converter 5 and held in place by a stop 12 with enclosed electronics 13.

Figure 7:
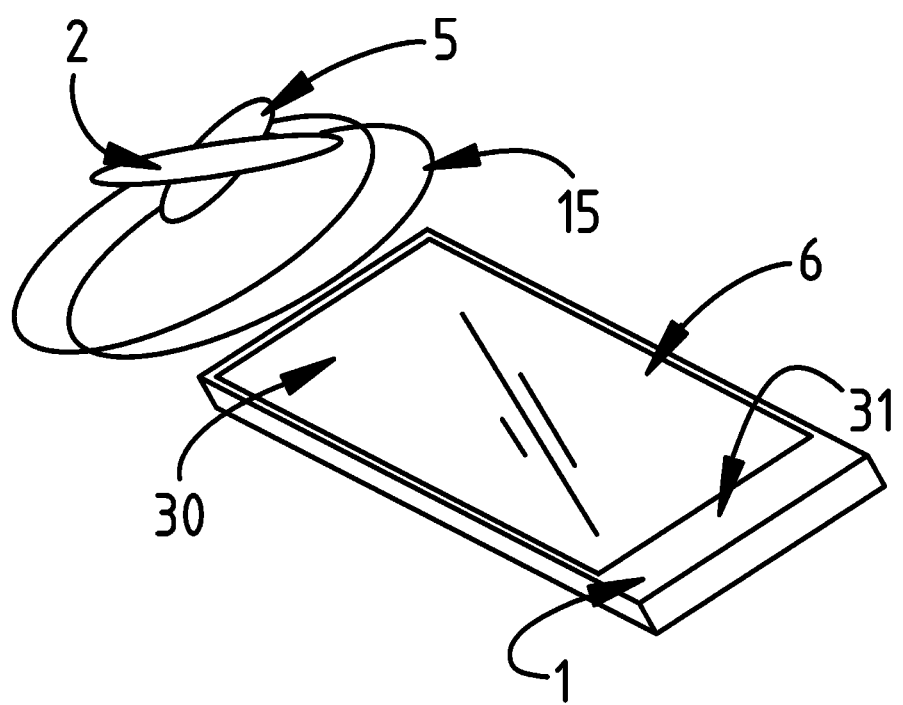
FIG. 7 is a perspective view of an ornamentally shaped tablet computer and mobile phone input and output converter system according to this invention

FIG. 7 details an ornamentally shaped output converter 5 and input converter 2 with a garter 15 which fits around or over a touchscreen 6. For alignment to the mobile phone or tablet computer 1 software displays a fiducial like marker 30 on the screen or touch pad/sense area 31 to allow the user to correctly align the converters.

Figure 8:
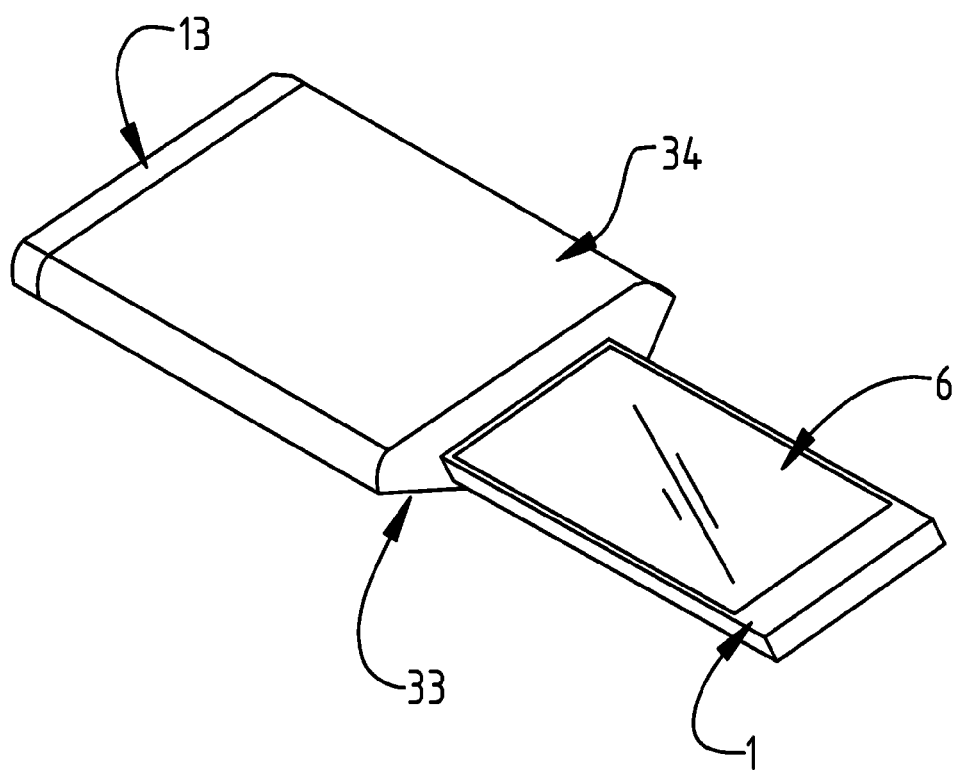
FIG. 8 is a perspective view of a sleeve tablet computer and mobile phone input and output converter system according to this invention

FIG. 8 details a sleeve tablet computer and mobile phone input and output converter elastic sleeve wherein the mobile phone or tablet computer 1 slides into the sleeve converter 34 which is comprised of elastic material 33 that secures the touchscreen 6 into proper alignment with the input converter and output converter with enclosed electronics 13.

Figure 9:
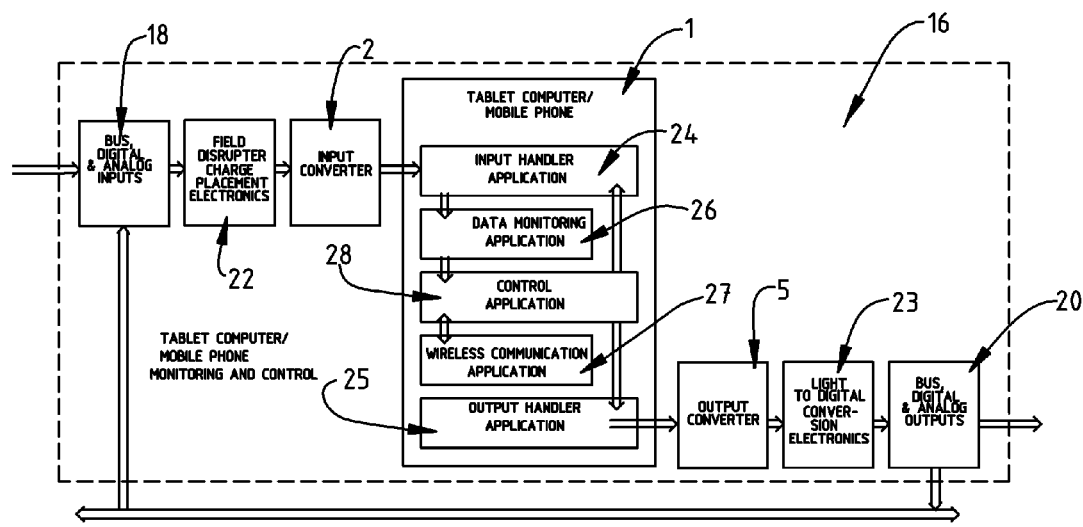
FIG. 9 is a schematic diagram illustrating the control of the input and output converter according to the embodiment of this invention

FIG. 9 details a single tablet computer/mobile phone monitoring and control system 16. Input is received from a bus or digital and analog inputs 18. Field disrupter charge placement electronics 22 send data to the input converter 2. The tablet computer/mobile phone 1 has an input handler 24, data monitoring 26, control 28, wireless communication 27, and an output handler 25. An output converter 5 and light to digital conversion electronics 23 produce bus, or digital or analog output 20.

Figure 10:
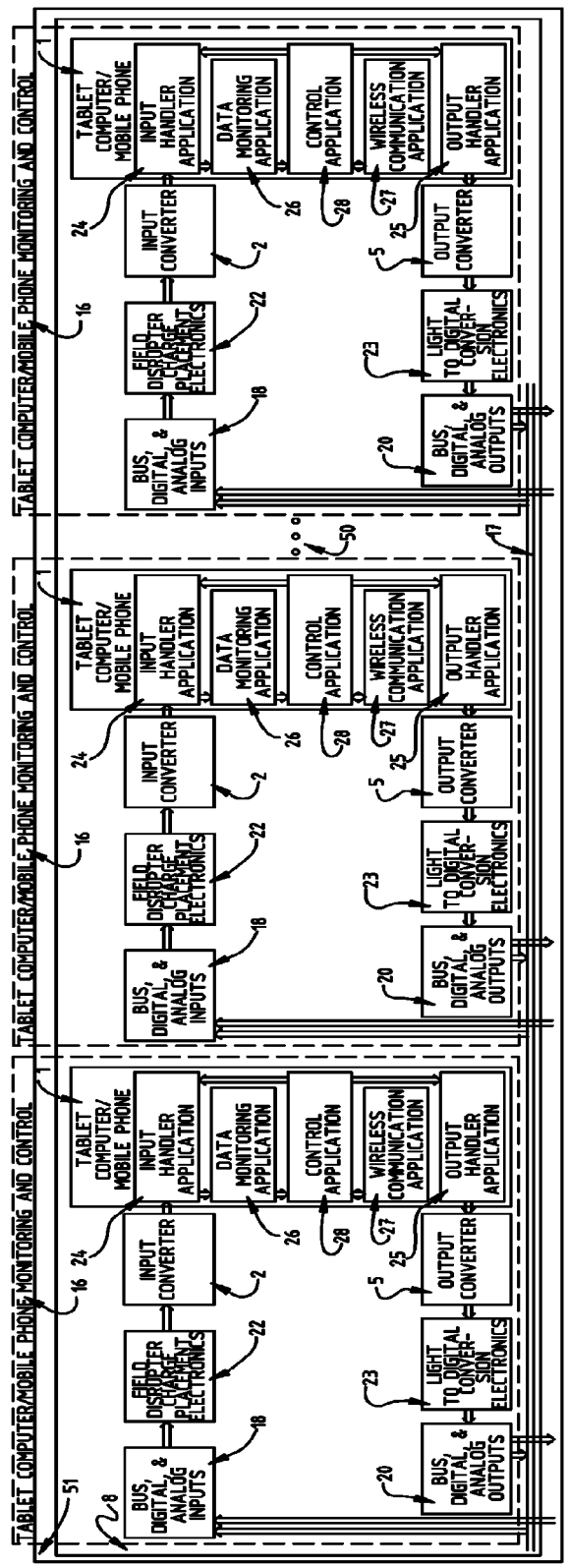
FIG. 10 is a multiple tablet computer/mobile phone schematic diagram illustrating the control of the input and output converters according to the embodiment of this invention

FIG. 10 The monitoring and control system shown comprises a larger scalable 50 system 8. A rack mount unit facilitates a larger system 51 more readily via a common back-plane or bus 17. Other units can coalesce via wireless communication to obtain multiprocessing or parallelism embodied in 51. A plurality of individual systems 16 embodied as an individual enclosure, sleeve, rack, angled surface, elastic band, combine into a larger system 51. The detail of each individual system 16 is as follows: Input is received from a bus or digital and analog inputs 18. Field disrupter charge placement electronics 22 send data to an input converter 2. The tablet computer/mobile phone 1 has an input handler 24, data monitoring 26, control 28, wireless communication 27, and an output handler 25. An output converter 5 and light to digital conversion electronics 23 produce bus, or digital or analog output 20.

Figure 11:
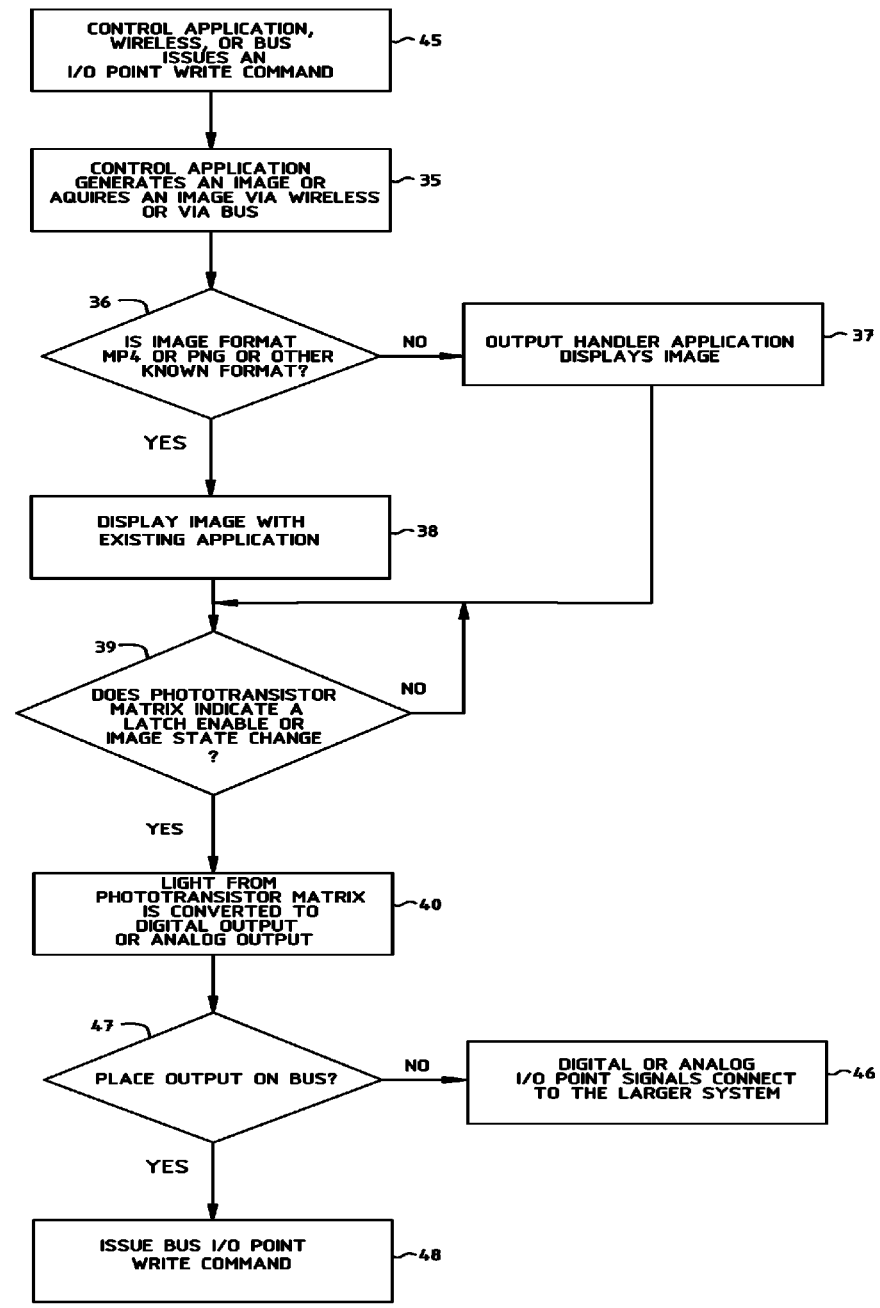
FIG. 11 is a flow diagram of the procedure for producing digital output of FIG. 9

FIG. 11 illustrates a flow chart describing a procedure for generating digital output from a mobile phone or tablet computer. In step 45 the control application on the tablet or phone itself is issuing a write command or is doing so in response to a wireless request to write or a bus request to write. An image is either generated or acquired 35 to present to the phototransistor matrix to convert to output. It is important to see that in many cases it is not necessary to write special software for displaying the images since most mobile phones and tablets are designed just for that purpose and existing applications can be utilized saving software engineering cost and taking advantage of the universal image and video formats 36. The image is displayed with a custom output handler application 37 or with an existing application 38. Each frame of video or an image has a change state bit (region of pixels, dot, or square) when this changes 39 it causes the data to be latched and converted to digital output data or analog output 40 to be placed on a bus 47 wherein a bus input or output write command is issued 48 or the digital or analog input or output point is connected to a larger system 46.

Figure 12:
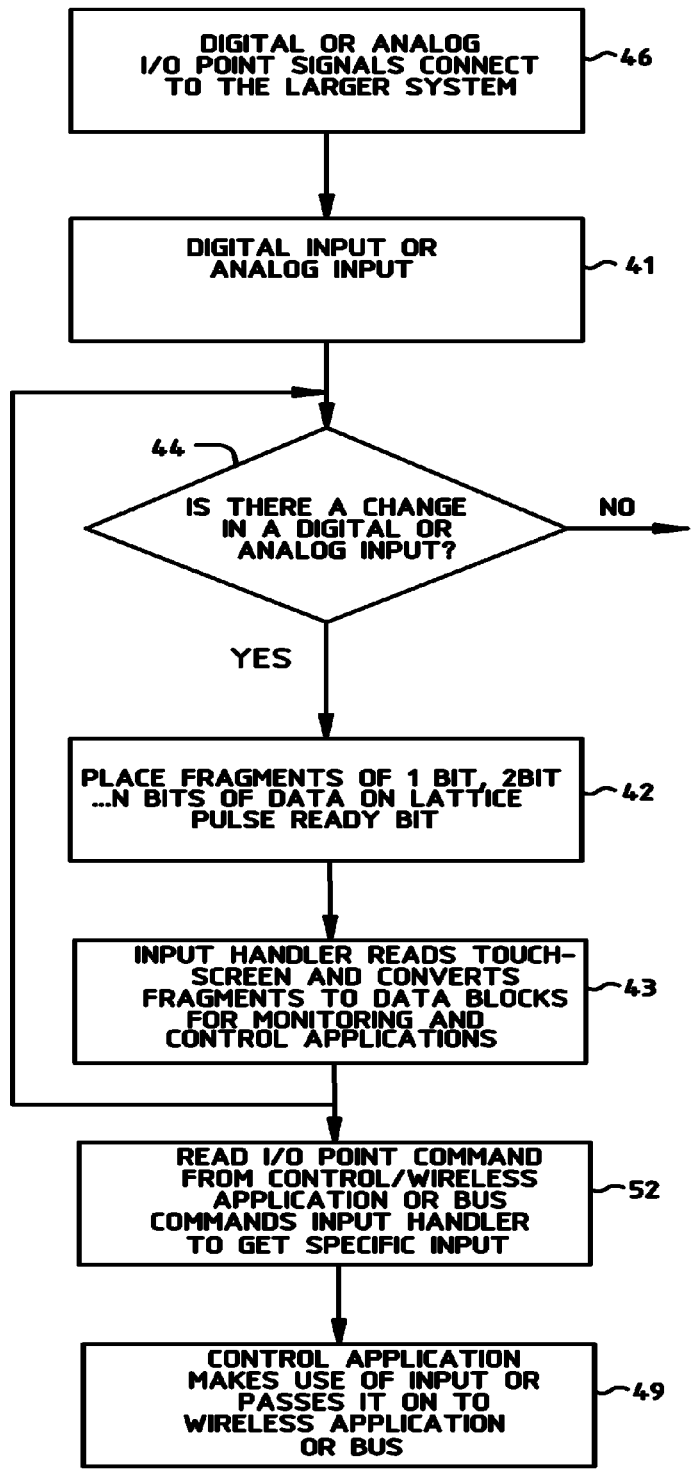
FIG. 12 is a flow diagram of the procedure for producing digital input of FIG. 9

FIG. 12 illustrates a flow chart describing the procedure for input 41 from digital or analog I/O signals from the larger system 46. An input list is scanned or a maskable (allowing prioritized culling) list of interrupts for input 44 indicates a new input is available. Fragments of 1 bit, 2 bit . . . n bits of data are placed on the lattice 42. The input handler reads the touch screen and converts fragments to data blocks 43. Input that has changed and is not culled or masked off is read in 52 The specific parts of the lattice are read for the input and the control application makes use of the input or passes it on to a wireless or bus output 49.

What is claimed is:

1. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, wherein a flow of electrons is initiated to a conductor body of a specific shape with the flow of electrons further allowed to flow in series to a second conductor body of a different shape, wherein the electric field of the touchscreen is disrupted, which rapidly triggers a single simulated finger touch or no touch on the mobile phone or tablet computer touchscreen, wherein continuous streams of several simulated finger touches may be generated on an individual touchscreen by electrifying pluralities of conductor bodies in series, which then are converted by programs on the mobile phone or tablet computer to a plurality of input signals into the mobile phone or tablet computer concurrent with any other mobile phones or tablet computers with the same input and output converter and connected to the same bus or wireless connection.

2. A mobile phone and tablet computer input and output converter in which continuously variable input and output points which are external to a mobile phone or tablet computer each corresponding to one of: a discrete digital signal, an analog signal, a bus read, a bus write, information, output command information, input status information are concurrently transferred without using a central/master or host computer into and out of at least one mobile phone or tablet computer comprising: at least one tablet computer or mobile phone, a plurality of phototransistors, an associated or integrated electronic circuit, and programs which convert a plurality of pixels, dots or squares on a touchscreen of the tablet computer or mobile phone to output points external to the mobile phone or tablet computer and an input converter consisting of a plurality of conductor bodies or pluralities of conductor body groupings; and an associated or integrated electronic circuit that converts input points external to the mobile phone or tablet computer by using conductor bodies which are selectively electrified which rapidly triggers a single finger touch and or no touch on the mobile phone or tablet computer touchscreen wherein continuous streams of several finger touches may be generated on an individual touchscreen simultaneously by electrifying pluralities of conductor bodies simultaneously, which then are converted by programs on each tablet computer or mobile phone to a plurality of input points into each mobile phone or tablet computer at the same time wherein the phototransistor matrix used for output and conductor bodies used for input are incorporated in an elastic sleeve, which squeezes the tablet computer or mobile phone providing a clamping force to press a mobile phone and tablet computer input and output converter against the touchscreen of a tablet computer or mobile phone wherein a releasing mechanical action, electromechanical action, pneumatic action, or hydraulic action expands open the sleeve open to remove or insert the tablet computer or mobile phone wherein the mobile phone and tablet computer input and output converter is used for continuous monitoring of a plurality of input signals, and continuous control of a plurality of output signals concurrent with any other mobile phones or tablet computers with the same input and output converters communicating via bus or wireless.

3. A mobile phone and tablet computer input and output converter that receives and transmits_continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter_comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the phototransistor matrix used for output and conductor bodies used for input are constructed of translucent or clear material, which adheres to the mobile phone or tablet computer touchscreen, wherein the mobile phone and tablet computer input and output converter is used for continuous monitoring of a plurality of input signals and continuous control of a plurality of output signals concurrent with any other mobile phones or tablet computers with the same input and output converter and connected to the same bus or wireless connection.

4. A plurality of mobile phone and tablet computer input and output converters that receive and transmit continuously variable input and output signals that are input to a plurality of mobile phones or tablet computers and output from a plurality of mobile phones or tablet c computers, said signals each corresponding to one of: a discrete digital signal, an analog signal, a bus read, a bus write, information, output command information, or input status information, wherein the signals are concurrently transferred without using a central/master or host computer into and out of the plurality of mobile phones or tablet computers, each of the converters comprising:

an output converter consisting of a plurality of phototransistors, an associated or integrated electronic circuit, and programs which convert a plurality of pixels, dots or squares on a touchscreen of a corresponding mobile phone or tablet computer to output signals output from the corresponding mobile phone or tablet computer; and an input converter consisting of a plurality of conductor bodies or pluralities of conductor body groupings and an associated or integrated electronic circuit that converts received input signals to the corresponding mobile phone or tablet computer by using conductor bodies which are selectively electrified, which rapidly triggers a single simulated finger touch or no touch on the corresponding mobile phone or tablet computer touchscreen, wherein continuous streams of several simulated finger touches may be generated on an individual touchscreen simultaneously by electrifying pluralities of conductor bodies simultaneously which then are converted by programs on each mobile phone or tablet computer to a plurality of input signals into each mobile phone or tablet computer, comprising a rack of a plurality of slots present to align the faces of the plurality of tablet computers and mobile phones and allow the plurality of mobile phone and tablet computer input and output converters to communicate, wherein the mobile phone and tablet computer input and output converters are used for continuous monitoring of a plurality of input signals and continuous control of a plurality of output signals concurrent with any other mobile phones or tablet computers with the same input and output converters and connected to the same bus or wireless connection.

\* \* \* \* \*